A. PATIGIAN.
BEARING SCRAPER.
APPLICATION FILED JUNE 15, 1920. RENEWED MAR. 16, 1922.

1,415,048.

Patented May 9, 1922.

WITNESSES

INVENTOR
A. Patigian,
BY
ATTORNEYS

UNITED STATES PATENT OFFICE.

ARTHUR PATIGIAN, OF MODESTO, CALIFORNIA.

BEARING SCRAPER.

1,415,048.      Specification of Letters Patent.      Patented May 9, 1922.

Application filed June 15, 1920, Serial No. 389,105. Renewed March 16, 1922. Serial No. 544,368.

*To all whom it may concern:*

Be it known that I, ARTHUR PATIGIAN, a citizen of the United States, and a resident of Modesto, in the county of Stanislaus and State of California, have invented certain new and useful Improvements in Bearing Scrapers, of which the following is a specification.

My invention is an improvement in bearing scrapers, and has for its object to provide a device of the character specified, adapted for scraping bearings of automobiles and other motors, wherein the scraper is power controlled, is easy to handle, and may be introduced into confined spaces, and wherein the cutter is removable and interchangeable to permit various forms of cutters to be used.

Figure 1:
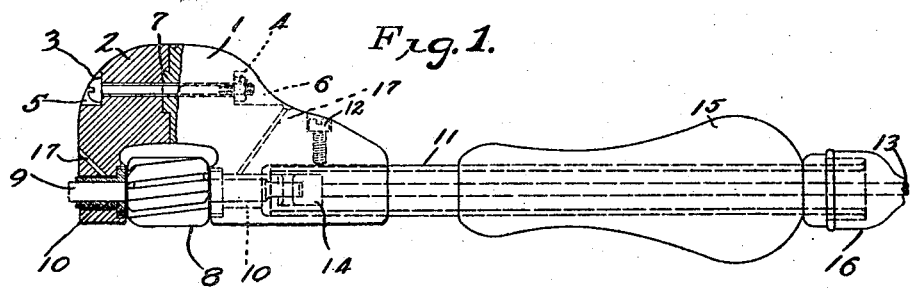
Figure 1 is a side view of the improved tool with parts in section.
Figure 2:
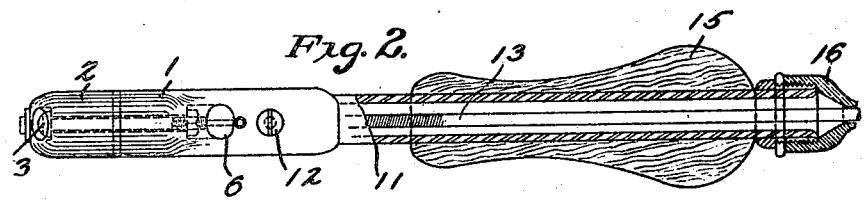
Figure 2 is a top plan view.

In the present embodiment of the invention, a suitable supporting frame is provided consisting of sections 1 and 2 which are detachably connected by means of a bolt 3 and nut 4, the bolt being passed through registering openings in the sections, and engaged by the nut as shown. The ends of the openings for the bolt are recessed or counterbored as shown at 5 and 6, respectively, for receiving the head and the nut, and it will be noticed that the sections 1 and 2 have at their abutting faces interengaging tongues and grooves indicated at 7, for preventing angular movement of the sections with respect to each other on the bolt.

The cutter 8 which may be of any suitable or desired construction, is mounted on a shaft 9, which is journaled in bushings 10 in the sections 1 and 2, and these bushings are held in openings in the sections. The sections are recessed at their abutting faces at one side, to form an opening for receiving the cutter and the shaft 9 extends across this opening, the bushings being at opposite sides of the opening.

The opening in the section for receiving the bushing 10 is extended through the section 1, and that end of the said opening remote from the section 2 is counter-bored to receive the end of a tubular member 11 which is held in the counterbored portion by means of a set screw 12. Within the tubular member, there is arranged a driving shaft 13 which is connected at its inner end by a suitable chuck 14 to the cutter shaft 9.

A suitable grip 15 is mounted on the tubular member 11, and a housing 16 for the driving shaft 13 is arranged on the outer end of the tubular member, being connected thereto by a swivel joint. The shaft 13 has a flexible portion which extends to the motor, and the said motor may be of any suitable or desired construction, as for instance an electric motor.

Passages 17 for lubricant are provided in the sections, the said passages leading to the bushings 10. In operation, the form of cutter desired is arranged in the space between the sections 1 and 2, and the cutters may be interchanged by means of the bolt and nut 3—4. With the parts assembled, the supporting frame 1—2 is introduced into the bearing to be scraped, and it will be obvious that when the shaft 9 is turned the cutter will thoroughly scrape and clean the bearing.

I claim:—

A device of the character specified, comprising a supporting frame having alined bearings, and a laterally opening recess between the bearings, a shaft journaled in the bearings and carrying a cutter, a driving shaft connected with the shaft, a tubular member connected with the supporting frame and enclosing said driving shaft and carrying a grip, said supporting frame being sectional between the bearings, and a bearing being provided in each section, and means for detachably holding the sections together.

ARTHUR PATIGIAN.